United States Patent
Orlovsky et al.

(10) Patent No.: US 10,423,268 B2
(45) Date of Patent: Sep. 24, 2019

(54) SYSTEM AND METHOD FOR DETECTING GROUNDING STATE OF A TOUCH ENABLED COMPUTING DEVICE

(71) Applicant: Microsoft Technology Licensing, LLC, Redmond, WA (US)

(72) Inventors: Michael Orlovsky, Rehovot (IL); Amil Winebrand, Petach-Tikva (IL); On Haran, Kfar-Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/977,721

(22) Filed: Dec. 22, 2015

(65) Prior Publication Data

US 2017/0177138 A1 Jun. 22, 2017

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0418* (2013.01)

(58) Field of Classification Search
CPC ............................... G06F 3/0416; G06F 3/044
USPC .......................................................... 345/173
See application file for complete search history.

(56) References Cited

U.S. PATENT DOCUMENTS

| | | | |
|---|---|---|---|
| 4,398,720 A | 8/1983 | Jones et al. | |
| 4,591,710 A | 5/1986 | Komadina et al. | |
| 4,672,154 A | 6/1987 | Rodgers et al. | |
| 4,686,332 A | 8/1987 | Greanias et al. | |
| 4,707,845 A | 11/1987 | Krein et al. | |
| 4,791,592 A | 12/1988 | Burgess | |
| 4,977,397 A | 12/1990 | Kuo et al. | |
| 5,117,071 A | 5/1992 | Greanias et al. | |
| 5,129,654 A | 7/1992 | Bogner | |
| 5,239,139 A | 8/1993 | Zuta | |
| 5,528,002 A | 6/1996 | Katabami | |
| 5,543,588 A | 8/1996 | Bisset et al. | |
| 5,574,262 A | 11/1996 | Petty | |
| 5,691,512 A | 11/1997 | Obi | |
| 5,825,345 A | 10/1998 | Takahama et al. | |

(Continued)

FOREIGN PATENT DOCUMENTS

| CN | 202092590 U | 12/2011 |
|---|---|---|
| CN | 103576997 A | 2/2014 |

(Continued)

OTHER PUBLICATIONS

Official Action dated Apr. 3, 2017 From the US Patent and Trademark Office Re. U.S. Appl. No. 15/050,656. (23 pages).

(Continued)

*Primary Examiner* — Benyam Ketema

(57) ABSTRACT

A method includes sampling output from sensor having electrode junctions integrated on a device including a display, detecting capacitance between the device ground and a user ($C_{BD}$) based on the output sampled and a pre-defined model, and defining one of two grounding states of the device based on the capacitance detected. Output is processed based on the grounding state defined and touch coordinates are determined based on the output processed. The touch coordinates are reported to a controller of the display.

20 Claims, 8 Drawing Sheets

(56) References Cited

U.S. PATENT DOCUMENTS

| | | | |
|---|---|---|---|
| 5,831,600 A | 11/1998 | Inoue et al. | |
| 5,841,078 A | 11/1998 | Miller et al. | |
| 5,854,881 A | 12/1998 | Yoshida et al. | |
| 5,859,392 A | 1/1999 | Petty | |
| 5,889,511 A | 3/1999 | Ong et al. | |
| 5,905,489 A | 5/1999 | Takahama et al. | |
| 5,923,320 A | 7/1999 | Murakami et al. | |
| 5,973,676 A | 10/1999 | Kawakura | |
| 6,020,849 A | 2/2000 | Fukuzaki | |
| 6,081,259 A | 6/2000 | Teterwak | |
| 6,229,529 B1 | 5/2001 | Yano et al. | |
| 6,239,389 B1* | 5/2001 | Allen | G06F 1/1626 178/18.01 |
| 6,417,846 B1 | 7/2002 | Lee | |
| 6,459,424 B1 | 10/2002 | Resman | |
| 6,690,156 B1 | 2/2004 | Weiner et al. | |
| 6,888,536 B2 | 5/2005 | Westerman et al. | |
| 7,244,901 B1 | 7/2007 | Liao et al. | |
| 7,248,249 B2 | 7/2007 | Kong et al. | |
| 7,292,229 B2 | 11/2007 | Morag et al. | |
| 7,372,455 B2 | 5/2008 | Perski et al. | |
| 7,643,010 B2 | 1/2010 | Westerman et al. | |
| 7,656,396 B2 | 2/2010 | Bosch et al. | |
| 7,725,089 B2 | 5/2010 | Lee et al. | |
| 7,843,439 B2 | 11/2010 | Perski et al. | |
| 7,868,874 B2 | 1/2011 | Reynolds | |
| 7,995,036 B2 | 8/2011 | Perski et al. | |
| 8,059,102 B2 | 11/2011 | Rimon et al. | |
| 8,130,203 B2 | 3/2012 | Westerman | |
| 8,278,571 B2 | 10/2012 | Orsley | |
| 8,289,289 B2 | 10/2012 | Rimon et al. | |
| 8,305,358 B2 | 11/2012 | Klinghult et al. | |
| 8,402,391 B1 | 3/2013 | Doray et al. | |
| 8,420,958 B2 | 4/2013 | Lu et al. | |
| 8,446,374 B2 | 5/2013 | Westerman | |
| 8,482,545 B2 | 7/2013 | King-Smith et al. | |
| 8,542,210 B2 | 9/2013 | Westerman | |
| 8,660,978 B2 | 2/2014 | Hinckley et al. | |
| 8,810,542 B2 | 8/2014 | Yousefpor | |
| 8,823,664 B2 | 9/2014 | Kyrynyuk et al. | |
| 8,994,692 B2 | 3/2015 | Yumoto et al. | |
| 9,035,905 B2 | 5/2015 | Saukko et al. | |
| 9,110,543 B1* | 8/2015 | Dabell | G06F 3/044 |
| 9,262,010 B2 | 2/2016 | Bulea | |
| 9,367,168 B2* | 6/2016 | Ahn | G06F 3/0416 |
| 9,495,052 B2* | 11/2016 | Shepelev | G06F 3/044 |
| 9,626,020 B2 | 4/2017 | Durojaiye et al. | |
| 9,632,622 B2 | 4/2017 | Hotelling et al. | |
| 9,823,774 B2* | 11/2017 | Winebrand | G06F 3/16 |
| 2002/0089491 A1 | 7/2002 | Willig | |
| 2003/0080946 A1 | 5/2003 | Chuang | |
| 2004/0027340 A1 | 2/2004 | Muraoka et al. | |
| 2004/0100450 A1 | 5/2004 | Choi | |
| 2004/0155871 A1 | 8/2004 | Perski et al. | |
| 2004/0160426 A1 | 8/2004 | DeGroot et al. | |
| 2004/0178995 A1 | 9/2004 | Sterling | |
| 2005/0189154 A1 | 9/2005 | Perski et al. | |
| 2005/0271259 A1 | 12/2005 | Lorch et al. | |
| 2006/0012580 A1 | 1/2006 | Perski et al. | |
| 2006/0017709 A1 | 1/2006 | Okano | |
| 2006/0097991 A1* | 5/2006 | Hotelling | G06F 3/0416 345/173 |
| 2006/0109252 A1 | 5/2006 | Kolmykov-Zotov et al. | |
| 2006/0139339 A1 | 6/2006 | Pechman et al. | |
| 2007/0103454 A1 | 5/2007 | Elias | |
| 2007/0152976 A1 | 7/2007 | Townsend et al. | |
| 2007/0285404 A1* | 12/2007 | Rimon | G06F 3/0416 345/173 |
| 2008/0012835 A1* | 1/2008 | Rimon | G06F 3/038 345/173 |
| 2008/0012838 A1 | 1/2008 | Rimon | |
| 2008/0128180 A1 | 6/2008 | Perski et al. | |
| 2008/0238885 A1 | 10/2008 | Zachut et al. | |
| 2009/0020343 A1 | 1/2009 | Rothkopf et al. | |
| 2009/0095540 A1* | 4/2009 | Zachut | G06F 3/044 178/18.03 |
| 2009/0160787 A1* | 6/2009 | Westerman | G06F 3/044 345/173 |
| 2009/0251434 A1 | 10/2009 | Rimon et al. | |
| 2010/0060608 A1* | 3/2010 | Yousefpor | G06F 3/0418 345/174 |
| 2010/0155153 A1 | 6/2010 | Zachut | |
| 2010/0156851 A1 | 6/2010 | Kurokawa | |
| 2010/0289752 A1 | 11/2010 | Birkler | |
| 2010/0321338 A1 | 12/2010 | Ely | |
| 2011/0012840 A1 | 1/2011 | Hotelling et al. | |
| 2011/0012855 A1 | 1/2011 | Yeh et al. | |
| 2011/0084929 A1 | 4/2011 | Chang et al. | |
| 2011/0155479 A1 | 6/2011 | Oda et al. | |
| 2011/0175835 A1* | 7/2011 | Wang | G06F 3/0416 345/173 |
| 2011/0254802 A1 | 10/2011 | Philipp | |
| 2011/0254807 A1 | 10/2011 | Perski et al. | |
| 2011/0284632 A1 | 11/2011 | Mullen et al. | |
| 2011/0291944 A1 | 12/2011 | Simmons et al. | |
| 2011/0310040 A1 | 12/2011 | Ben-Shalom et al. | |
| 2012/0013555 A1* | 1/2012 | Maeda | G06F 3/03545 345/173 |
| 2012/0050180 A1 | 3/2012 | King et al. | |
| 2012/0105362 A1 | 5/2012 | Kremin et al. | |
| 2012/0133616 A1 | 5/2012 | Nishihara et al. | |
| 2012/0158629 A1 | 6/2012 | Hinckley et al. | |
| 2012/0182238 A1 | 7/2012 | Lee | |
| 2012/0249457 A1 | 10/2012 | Chou et al. | |
| 2013/0009896 A1 | 1/2013 | Zaliva | |
| 2013/0009907 A1 | 1/2013 | Rosenberg et al. | |
| 2013/0027361 A1 | 1/2013 | Perski et al. | |
| 2013/0127757 A1* | 5/2013 | Mann | G06F 3/041 345/173 |
| 2013/0132903 A1 | 5/2013 | Krishnaswamy | |
| 2013/0176270 A1 | 7/2013 | Cattivelli et al. | |
| 2013/0176280 A1* | 7/2013 | Wu | G06F 3/044 345/174 |
| 2013/0249950 A1 | 9/2013 | Mahmoud et al. | |
| 2013/0265258 A1* | 10/2013 | Garfinkel | G06F 3/0416 345/173 |
| 2013/0278543 A1* | 10/2013 | Hsu | G06F 3/044 345/174 |
| 2013/0285973 A1 | 10/2013 | Elias et al. | |
| 2013/0300668 A1 | 11/2013 | Churikov et al. | |
| 2013/0300672 A1 | 11/2013 | Griffin | |
| 2013/0300696 A1* | 11/2013 | Haran | G06F 3/041 345/173 |
| 2013/0328832 A1 | 12/2013 | Boumgarten | |
| 2014/0152620 A1 | 6/2014 | Perski et al. | |
| 2014/0168116 A1 | 6/2014 | Sasselli et al. | |
| 2014/0176447 A1 | 6/2014 | Alameh et al. | |
| 2014/0184554 A1 | 7/2014 | Walley | |
| 2014/0320445 A1 | 10/2014 | Kim | |
| 2015/0049044 A1* | 2/2015 | Yousefpor | G06F 3/044 345/174 |
| 2015/0070310 A1 | 3/2015 | Suzuki et al. | |
| 2015/0109243 A1 | 4/2015 | Jun et al. | |
| 2015/0177089 A1 | 6/2015 | Ferran et al. | |
| 2015/0193025 A1 | 7/2015 | Rebeschi et al. | |
| 2015/0363067 A1* | 12/2015 | Winebrand | G06F 3/0416 345/173 |
| 2016/0041685 A1 | 2/2016 | Perski et al. | |
| 2016/0098742 A1* | 4/2016 | Minicucci | G06Q 30/0226 705/14.27 |
| 2016/0266673 A1* | 9/2016 | Dinu | G06F 3/044 |
| 2016/0274700 A1 | 9/2016 | Mishalov | |
| 2017/0177110 A1* | 6/2017 | Winebrand | G06F 3/044 |
| 2017/0177138 A1 | 6/2017 | Orlovsky et al. | |

FOREIGN PATENT DOCUMENTS

| | | |
|---|---|---|
| EP | 0684580 | 11/1995 |
| EP | 1422601 | 5/2004 |
| EP | 1717677 | 11/2006 |
| EP | 2659832 A1 | 11/2013 |
| JP | 05-173698 | 7/1993 |

(56) References Cited

FOREIGN PATENT DOCUMENTS

| | | |
|---|---|---|
| JP | 07-311647 | 11/1995 |
| JP | 09-325852 | 12/1997 |
| JP | 10-031545 | 2/1998 |
| JP | 2002-207563 | 7/2002 |
| TW | 201537442 | 10/2015 |
| WO | WO 03/019346 | 3/2003 |
| WO | WO 2005/081631 | 9/2005 |
| WO | WO 2009/108334 | 9/2009 |
| WO | WO 2011/154950 | 12/2011 |
| WO | WO 2012/111010 | 8/2012 |
| WO | WO 2012/140656 | 10/2012 |
| WO | WO 2013/171747 | 11/2013 |
| WO | 2014149243 A1 | 9/2014 |
| WO | WO 2014/145872 | 9/2014 |

OTHER PUBLICATIONS

International Search Report and the Written Opinion dated May 23, 2006 From the International Searching Authority Re.: Application No. PCT/IL05/00229.
Communication Pursuant to Article 94(3) EPC dated Nov. 13, 2012 From the European Patent Office Re. Application No. 05709125.8.
Communication Pursuant to Article 94(3) EPC dated May 15, 2014 From the European Patent Office Re. Application No. 05709125.8.
Communication Pursuant to Article 94(3) EPC dated Jul. 19, 2012 From the European Patent Office Re. Application No. 05709125.8.
Communication Pursuant to Article 94(3) EPC dated Jun. 20, 2013 From the European Patent Office Re. Application No. 05709125.8.
Communication Pursuant to Article 94(3) EPC dated Nov. 22, 2013 From the European Patent Office Re. Application No. 05709125.8.
Communication Relating to the Results of the Partial International Search dated Sep. 4, 2013 From the International Searching Authority Re. Application No. PCT/IL2013/050417.
Decision to Refuse a European Patent Application (Article 97(2) EPC) dated Jul. 3, 2015 From the European Patent Office Re. Application No. 05709125.8.
International Preliminary Report on Patentability dated Nov. 27, 2014 From the International Bureau of WIPO Re. Application No. PCT/IL2013/050417.
International Search Report and the Written Opinion dated Dec. 20, 2013 From the International Searching Authority Re. Application No. PCT/IL2013/050417.
Notice of Allowance dated Jun. 10, 2015 From the US Patent and Trademark Office Re. U.S. Appl. No. 14/176,289.
Official Action dated Jun. 5, 2012 From the US Patent and Trademark Office Re. U.S. Appl. No. 13/171,601.
Official Action dated Oct. 5, 2015 From the US Patent and Trademark Office Re. U.S. Appl. No. 13/892,381.
Official Action dated Dec. 8, 2009 From the US Patent and Trademark Office Re.: U.S. Appl. No. 11/063,535.
Official Action dated Jan. 13, 2016 From the US Patent and Trademark Office Re. U.S. Appl. No. 13/892,381.
Official Action dated Nov. 15, 2011 From the US Patent and Trademark Office Re. U.S. Appl. No. 13/171,601.
Official Action dated Mar. 18, 2015 From the US Patent and Trademark Office Re. U.S. Appl. No. 13/892,381.
Official Action dated Dec. 22, 2010 From the US Patent and Trademark Office Re.: U.S. Appl. No. 11/063,535.
Official Action dated May 25, 2010 From the US Patent and Trademark Office Re.: U.S. Appl. No. 11/063,535.
Official Action dated May 27, 2009 From the US Patent and Trademark Office Re.: U.S. Appl. No. 11/063,535.
Official Action dated Mar. 28, 2013 From the US Patent and Trademark Office Re. U.S. Appl. No. 13/644,331.
Proceedings Further With the European Patent Application Pursuant to Rule 70(2) EPC dated Apr. 13, 2012 From the European Patent Office Re. Application No. 05709125.8.
Summons to Attend Oral Proceedings Pursuant to Rule 115(1) EPC dated Dec. 15, 2014 From the European Patent Office Re. Application No. 05709125.8.
Supplementary European Search Report dated Mar. 27, 2012 From the European Patent Office Re. Application No. 05709125.8.
Translation of Decision of Rejection dated Jun. 2, 2011 From the Japanese Patent Office Re.: Application No. 2007-500353.
Translation of Notification of Reasons of Rejection dated May 21, 2010 From the Japanese Patent Office Re.: Application No. 2007-500353.
Hughes "Apple's Stylus Receiver Concept Would Improve the Precision of Digital Pen-Based Input", Follow AppleInsider, Quiller Media, 8 P., Jan. 29, 2015.
Park et al. "A Pen-Pressure-Sensitive Capacitive Touch System Using Electrically Coupled Resonance Pen", IEEE Journal of Solid-State Circuits, 51(1): 168-176, Jul. 30, 2015.
Wang et al. "Detecting and Leveraging Finger Orientation for Interaction with Direct-Touch Surfaces", UIST '09 Proceedings of the 22nd Annual ACM Symposium on User Interface Software and Technology: 23-32, Jul. 4, 2009.
International Search Report and the Written Opinion dated Jun. 3, 2016 From the International Searching Authority Re. Application No. PCT/US2016/022760.
Official Action dated Dec. 30, 2016 From the US Patent and Trademark Office Re. U.S. Appl. No. 13/892,381. (24 pages).
Written Opinion dated Feb. 1, 2017 From the International Preliminary Examining Authority Re. Application No. PCT/US2016/022760. (8 Pages).
Advisory Action Before the Filing of an Appeal Brief dated Sep. 29, 2016 From the US Patent and Trademark Office Re. U.S. Appl. No. 13/892,381.
Official Action dated Jul. 8, 2016 From the US Patent and Trademark Office Re. U.S. Appl. No. 13/892,381.
Applicant-Initiated Interview Summary dated May 2, 2017 From the US Patent and Trademark Office Re. U.S. Appl. No. 13/892,381. (3 pages).
International Search Report and the Written Opinion dated Apr. 11, 2017 From the International Searching Authority Re. Application No. PCT/US2016/066737. (14 Pages).
Applicant-Initiated Interview Summary dated Jul. 19, 2017 From the US Patent and Trademark Office Re. U.S. Appl. No. 14/977,766. (3 pages).
International Preliminary Report on Patentability dated Jun. 6, 2017 From the International Preliminary Examining Authority Re. Application No. PCT/US2016/022760. (9 Pages).
Restriction Official Action dated Aug. 3, 2017 From the US Patent and Trademark Office Re. U.S. Appl. No. 15/070,380. (6 Pages).
Official Action dated Jun. 1, 2017 From the US Patent and Trademark Office Re. U.S. Appl. No. 14/977,766. (35 Pages).
Official Action dated Jun. 14, 2017 From the US Patent and Trademark Office Re. U.S. Appl. No. 13/892,381. (26 pages).
Official Action dated Oct. 27, 2017 From the US Patent and Trademark Office Re. U.S. Appl. No. 14/977,766. (24 pages).
Applicant-Initiated Interview Summary dated Jan. 4, 2018 From the US Patent and Trademark Office Re. U.S. Appl. No. 14/977,766. (3 pages).
Official Action dated Feb. 16, 2018 From the US Patent and Trademark Office Re. U.S. Appl. No. 14/977,766. (17 pages).
"AN11623 LPC82x Touch Solution Hardware Design Guide", Retrieved From: https://www.mouser.com/pdfdocs/NXPLPC82xTouchSolutionHardwareDesignGuide.PDF, Dec. 22, 2014, 18 Pages.
"Capacitive Sensing Solutions from Silicon Labs", Retrieved From: https://web.archive.org/web/20140831110204/http://www.silabs.com/Support%20Documents/TechnicalDocs/CapacitiveTouchSenseTechnologySPKR.pdf, Aug. 31, 2014, 53 Pages.
"MTI Instruments Capacitance Measurement Products", Retrieved From: http://www.mtiinstruments.com/technology/Capacitance.aspx, Retrieved on: Jul. 16, 2015, 9 Pages.
"Non Final Office Action Issued in U.S. Appl. No. 15/070,380", dated Jan. 11, 2018, 14 Pages.
Allan, Roger, "How to Select the Right Touch Sensing Approach for Your Design", Retrieved From: http://www.digikey.com/es/articles/

(56) References Cited

OTHER PUBLICATIONS techzone/2011/aug/how-to-select-the-right-touch-sensing-approach-for-your-design, Aug. 25, 2011, 4 Pages.

Camacho, et al., "Designing Touch Sensing Electrodes: Electrical Considerations and Recommended Layout Patterns", In Free Semiconductor Application Note, Document No. AN3863, Rev 4, Jul. 2011, 28 Pages.

Carey, John, "Smart Phone Design: Projected Capacitance Fueling Innovation", Retrieved From: https://www.eeweb.com/profile/john-carey/articles/smart-phone-design-projected-capacitance-fueling-innovation, Aug. 18, 2011, 5 Pages.

Goel, et al., "GripSense: Using Built-In Sensors to Detect Hand Posture and Pressure on Commodity Mobile Phones", In Proceedings of the 25th Annual ACM Symposium on User Interface Software and Technology, Oct. 7, 2012, pp. 545-554.

Harrison, et al., "Capacitive Fingerprinting: Exploring User Differentiation by Sensing Electrical Properties of the Human Body", In Proceedings of the 25th annual ACM symposium on User Interface Software and Technology, Oct. 7, 2012, pp. 537-544.

Leigh, et al., "High Rate, Low-Latency Multi-Touch Sensing with Simultaneous Orthogonal Multiplexing", In Proceedings of the 27th annual ACM symposium on User interface software and technology, Oct. 5, 2014, pp. 355-364.

\* cited by examiner

SYSTEM AND METHOD FOR DETECTING GROUNDING STATE OF A TOUCH ENABLED COMPUTING DEVICE

BACKGROUND

Capacitive sensors are used for touch detection in many Human Interface Devices (HID) such as laptops, trackpads, MP3 players, computer monitors, and smart-phones. The capacitive sensor senses positioning and proximity of a conductive object such as a conductive stylus or finger used to interact with the HID. The capacitive sensor is often integrated with an electronic display to form a touch-screen. Capacitive sensors include antennas or lines constructed from different media, such as copper, Indium Tin Oxide (ITO) and printed ink. ITO is typically used to achieve transparency. Some capacitive sensors are grid based and operate to detect either mutual capacitance between the electrodes at different junctions in the grid or to detect self-capacitance at lines of the grid.

SUMMARY

According to some embodiments of the present disclosure there is a provided a system and method to monitor capacitance between a user and a touch enabled computing device ($C_{BD}$) while a user is interacting with the computing device by touch. The system and method described herein specifically relate to a touch enabled computing device that includes a capacitive based sensor having electrode junctions, e.g. a digitizer sensor. A physical model relating $C_{BD}$ to detected touch signals on the digitizer sensor is defined and implemented. In some exemplary embodiments, a grounding state machine toggles defines one of a 'Grounded' state and 'Ungrounded' state of the device based on accumulated averages of $C_{BD}$.

A computing device's grounding state may change significantly while a user is interacting with the computing device. This is especially the case for mobile devices. Changes may occur when plugging/unplugging the computing device to a power source, moving the computing device from one type of surface to another, connecting/disconnecting the computing device to another device, or when touching/releasing a metallic part of the computing device, e.g. the chassis. Touch signals are typically sensitive to the grounding state of the computing device. In some embodiments of the present disclosure, defined grounding state determines processing schemes applied to the touch signals based on known characteristics of touch signal for that grounding state. Optionally, the adapted processing provides improved performance palm detection and multi-finger touch detection.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
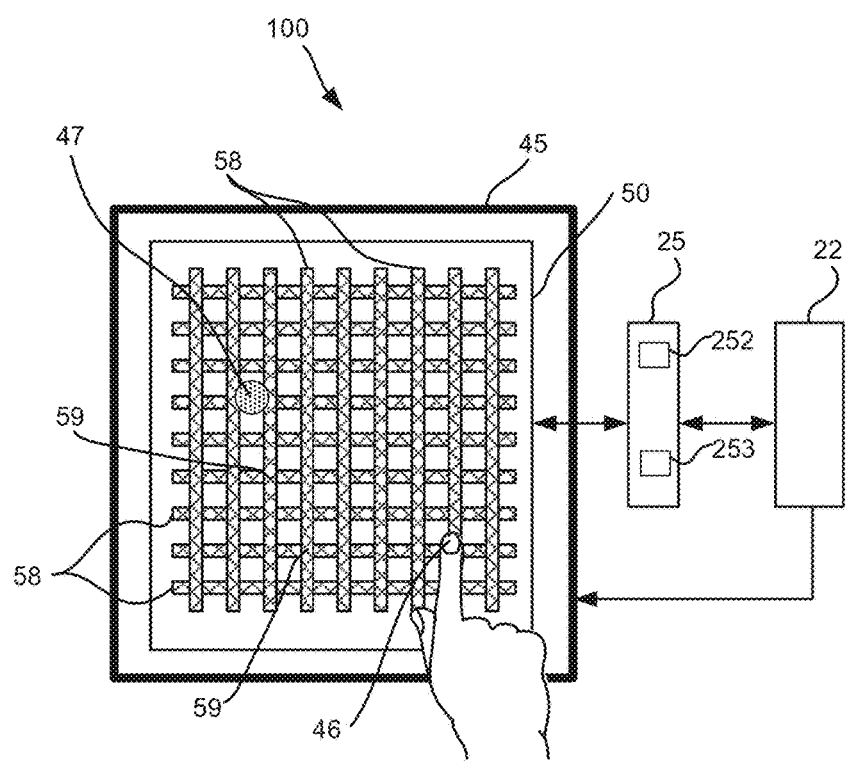
FIG. 1 is a simplified block diagram of an exemplary touch enabled computing device in accordance with some embodiments of the present disclosure.

Capacitance between the user and the computing device ($C_{BD}$) may be highly dynamic. High capacitance may be detected when the computing device is well grounded. For example, capacitance above 500 pF may be detected while a user holds a chassis of the computing device and capacitance above 50 pF may be detected while the computing device is connected to an external power source with two prong plug and above 100 pF while the computing device is connected to an external power source with three prong plug. Low capacitance, e.g. below 30 pF may be detected while the computing device is ungrounded. For example, low capacitance may be detected while a computing device is resting on a pillow and disconnected from an external power source. While the computing device is ungrounded, touch signals detected with the digitizer sensor are prone to produce a lower relative effect (or finger effect) and distortions. These distortions are more prominent during multi-touch detection and palm input. The relative effect as defined herein is a difference between baseline amplitude detected with no touch input and an amplitude detected at a touched location.

According to some exemplary embodiments, a threshold on running averages of detected $C_{BD}$ is used toggle between defining a computing device as grounded or ungrounded. Optionally, $C_{BD}$ below 50 pF is defined as ungrounded and above 50 pF is defined as grounded. While a computing device is ungrounded, processing schemes that account for distortions, lower relative effect or other properties of the touch signal that are typical for an ungrounded state may be applied. Likewise, while a computing device is grounded, processing schemes that are geared to touch signals typically detected during a grounded state are applied.

In some exemplary embodiments, touch signals are first analyzed to determine suitability for $C_{BD}$ detection based on the defined model. Optionally, only frames that meet defined criteria are selected. Typically, a grounding state is first defined by average $C_{BD}$ over a relatively smaller pool of frames, e.g. 2-10 frames or 8 frames and then subsequent determinations are based on larger samples of frames, e.g. 20-50 frames or 32 frames.

Reference is now made to FIG. 1 a simplified block diagram of an exemplary touch enabled computing device in accordance with some embodiments of the present disclosure. According to some embodiments of the present disclosure, a computing device 100 includes a display 45 integrated with a digitizer sensor 50. Digitizer sensor 50 typically includes a matrix formed with parallel conductive material 58 arranged in rows and columns with a capacitive connection in junction areas 59 formed between rows and columns.

Digitizer circuitry 25 applies mutual capacitive detection or a self-capacitive detection for sensing a touch signal from touch (or hover) of fingertip 46. Bringing a grounded finger 46 close to the surface of digitizer sensor 50 changes the local electrostatic field and reduces the mutual capacitance at junctions 59 in the touched area. Bringing a conductive floating token 47, close to the surface of digitizer sensor 50 increases the mutual capacitance at junctions 59 of the touched area. A change in mutual capacitance may be detected by a circuit 25 when applying a drive signal along one axis (the drive lines) of the matrix while sampling output on the other axis (the receive lines) to detect a coupled signal. Finger touch has the effect of reducing amplitude of the measured signal while touch by floating token 47 has the effect of increasing amplitude of the measured signal. Output from digitizer sensor 50 may be in the form of a heatmap that maps detected amplitudes of the coupled signals at each junction. In a heatmap, finger touch produces a negative blob at the finger touch location and a floating conductive object produces a positive blob at the location of the floating conductive object.

According to some embodiments of the present disclosure, digitizer circuitry 25 includes a dedicated engine 252 for estimating a determining $C_{BD}$ from the heatmap or output detected and a state machine 253 for defining a grounding state of the computing device based on the $C_{BD}$. In some exemplary embodiments, $C_{BD}$ detection engine 252 is associated with memory that stores one or more look-up tables for relating detected touch signals to a level of capacitance between a user with fingertip 46 and device 100. Typically, grounding state machine 253 is also associated with memory for storing parameters, e.g. thresholds, accumulated averages of $C_{BD}$ and instructions for altering processing schemes based on the grounding state defined. Optionally, circuit 25 adapts processing of the touch signals sampled based on output from grounding state detection engine 253.

Typically, output from digitizer circuitry 25 is reported to host 22. Typically, the output provided by digitizer circuitry 25 may include coordinates of one or more fingertips 46. Optionally, a dedicated grounding state is reported or $C_{BD}$ is reported. Typically, digitizer circuitry 25 uses both analog and digital processing to process signals detected with digitizer sensor 50. Optionally, some and/or all of the functionalities of $C_{BD}$ detection engine 252 and state machine 253 is integrated in one or more processing units adapted for controlling operation of digitizer sensor 50. Optionally, some and/or all of the functionalities of digitizer circuitry 25, $C_{BD}$ detection engine 252 and state machine 253 is integrated and/or included in host 22.

Figure 2:
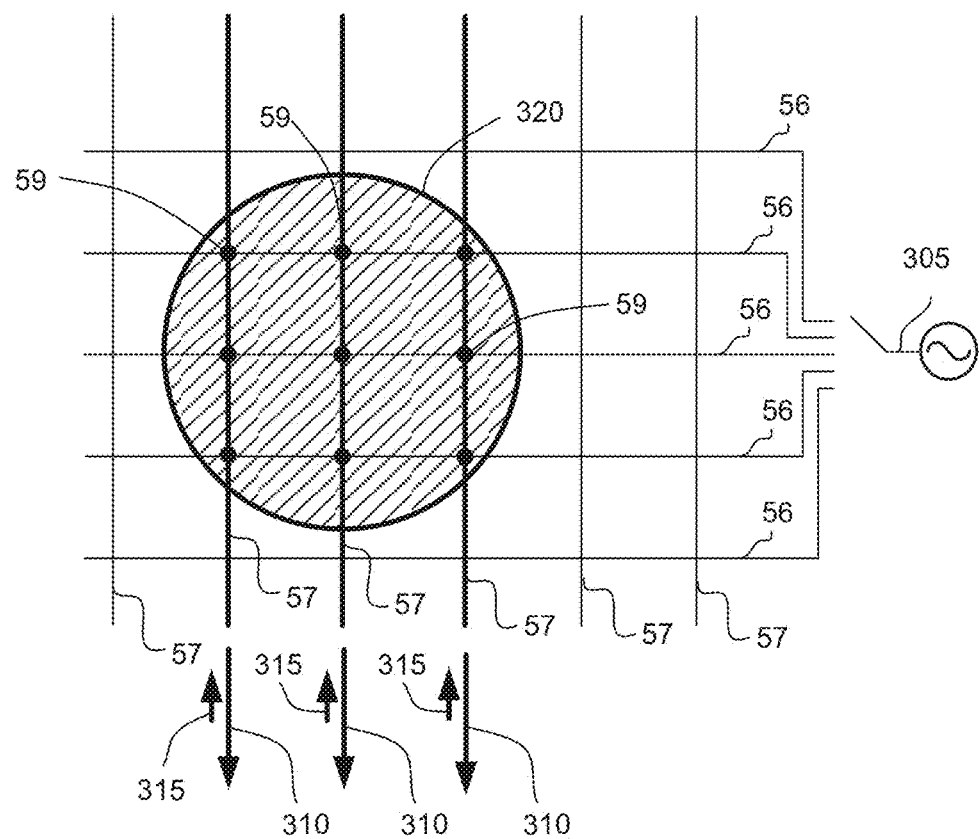
FIG. 2 is a schematic representation of the relative effect on a grid based capacitive sensor with one finger touching the digitizer sensor in accordance with some embodiments of the present disclosure.

Reference is now to FIG. 2 showing a schematic representation of the relative effect on a grid based capacitive sensor with one finger touching the digitizer sensor. Only a portion of digitizer sensor 50 is shown for simplicity. A presence of a finger at location 320 reduces mutual capacitance at junctions 59 in location 320. Due to the reduced mutual capacitance, when a drive signal 305 is imposed on drive lines 56, amplitudes detected on the touched receive lines 57 are lower than amplitude detected on other receive lines 57. Reduced amplitudes due to the reduced mutual capacitances are represented by arrows 310. At the same time, potential may be induced on the finger from drive signal 305. This potential may be injected on receive lines 57 which increases amplitudes of the outputs as represented by arrows 315. The output detected from the touched receive lines is therefore a summation of amplitude 310 and amplitude 315. Typically, output detected from a single finger touch produces a negative blob having amplitude that varies based on the magnitude of the induced potential. In some exemplary embodiments, a threshold on amplitude for detecting touch may be adjusted based on the detected grounding state of the computing device.

Figure 3:
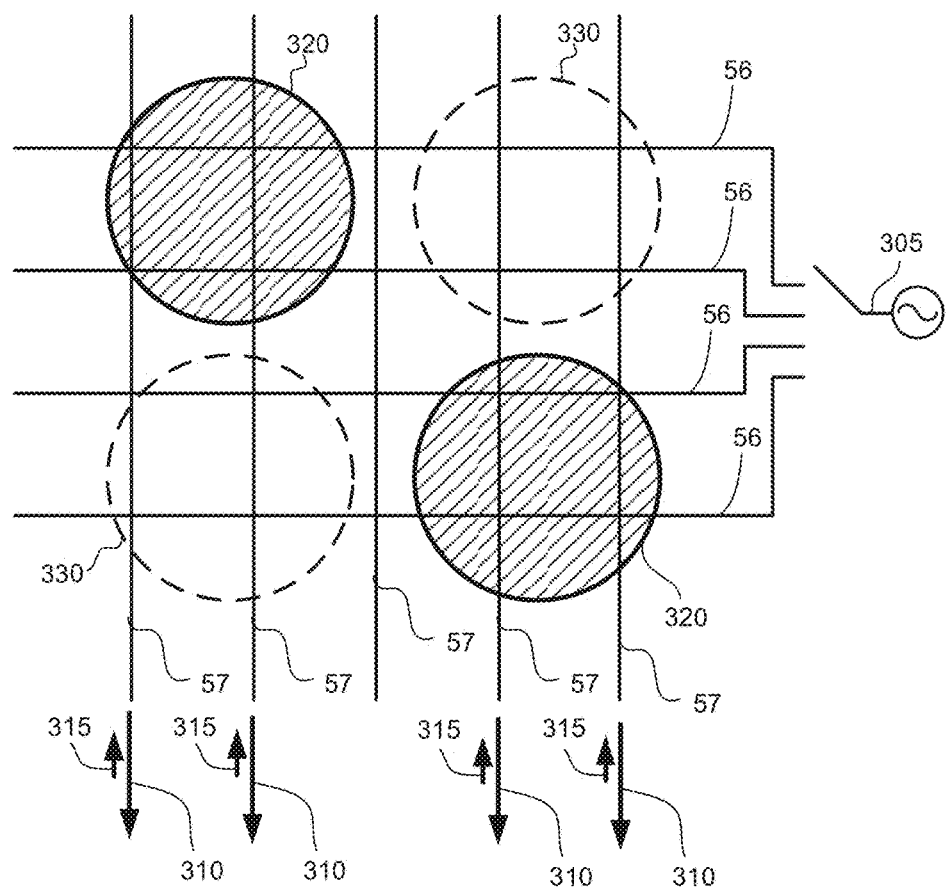
FIG. 3 is a schematic representation of the relative effect on a grid based capacitive sensor when two fingers are touching the digitizer sensor.

When more than one finger is touching the sensing surface or when part of the hand is also touching the sensing surface, the potential induced on one finger or part of the hand spreads to other parts of the digitizer sensor touched by other fingers or other parts of the hand. FIG. 3 shows a schematic representation of the relative effect on a grid based capacitive sensor when two fingers are touching the digitizer sensor. Simultaneous finger touch at locations 320 may lead to a drive signal 305 transmitted on drive lines 56 crossing one location 320 to spread on to receive lines 57 that cross both locations 320. Potential induced on a finger that is not touching the current drive line may introduce positive blob ghosts 330. The induced potential also reduces the relative effect detected at touch locations 320 as discussed in reference to FIG. 2. The effect of the induced potential on the hand may also lead to blob deformation when a relatively large area is touched, e.g. due to palm input or when multiple touches occur in close proximity.

Figure 4:
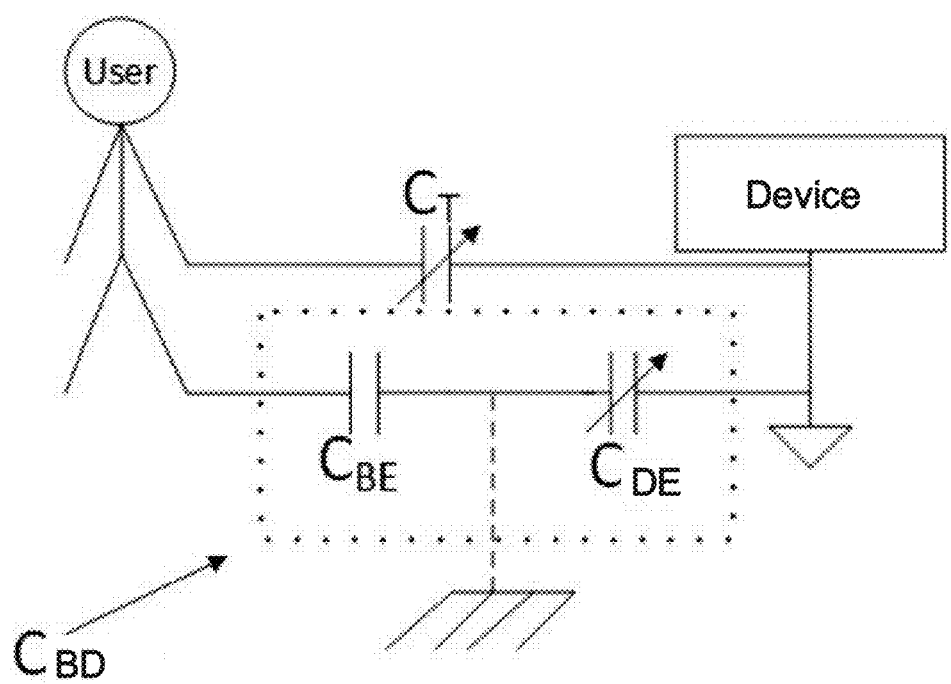
FIG. 4 is a simplified block diagram describing capacitance between a user and a touch enabled computing system in accordance with some embodiments of the present disclosure.

Reference is now made to FIG. 4 showing a simplified block diagram describing capacitance between a user and a touch enabled computing system in accordance with some embodiments of the present disclosure. Capacitance between a user and a touch enabled computing device is defined by touch capacitance ($C_T$) between the user and the digitizer sensor due to a user touching the touch screen, body earth capacitance ($C_{BE}$) between the user and earth ground and device earth capacitance ($C_{DE}$) between the computing device ground and earth ground. CBD is the combination of $C_{BE}$ and $C_{DE}$.

$C_T$ is typically a function of surface contact between the user and the digitizer sensor as well as physical parameters of the touch-screen. $C_T$ increases as more fingers touch the digitizer sensor or due to palm contact and decreases with less contact. In some exemplary embodiments, $C_T$ may be estimated from the heat map based on the following relationship:

$$C_T = (N_{Total})(C_D) \qquad \text{Equation (1)}$$

Where $N_{Total}$ is the number of junctions 59 touched and $C_D$ is a constant that represents capacitance of the device due to both physical properties of the conductive strips 58 and display 45 and also due to proximity between the elements. Optionally, Equation (1) may also include parameters that account for palm touch and size of each finger touch.

$C_{BE}$ is typically ranges between 100-300 pF. $C_{DE}$ can differ between devices based on their constructions and components included in the device. $C_{DE}$ also changes with changing conditions in the surrounding environment. As described herein above, $C_{DE}$ can increase significantly when the device is plugged into a power outlet, connected to another device, or when a user grounds the device by touching its chassis. The capacitance ($C_{BD}$) between the device ground and the user can be defined by:

$$1/C_{BD} = 1/C_{BE} + 1/C_{DE} \qquad \text{Equation (2)}$$

And the total capacitance ($C_{Total}$) between the user and the device can be defined by:

$$C_{Total} = C_{BD} + C_T \qquad \text{Equation (3)}$$

According to some embodiments of the present invention, $C_{Total}$ may also be estimated based on the detected heatmap using the following relationship:

$$C_{Total} = (N_H)(N_V)(C_E)/P \qquad \text{Equation (4)}$$

Where:

$C_E$ is a second constant and can be obtained with empirical data or simulations and represents capacitive coupling at the junctions due to physical properties of the conductive strips 58 and the geometry between them. P is the peak relative effect at a location with a perceived maximum potential induced on the finger from the drive signal. For single finger touch, P is typically peak amplitude at the touch location. In cases where positive blob ghosts are present, P is peak amplitude of the positive blob ghosts. P may also be defined by the following equation:

$$P = FE_G - FE_D \qquad \text{Equation (5)}$$

Where:

$FE_G$ is an ideal relative effect (or finger effect) that is detected when the computing device has a same impedance to earth ground as the user and $FE_D$ is the detected relative effect; and $N_H$ is a number of touched junctions along a row conductive line crossing the location at which P is detected and $N_v$ is a number of touched junctions along a column conductive line crossing the location of P. $C_{BD}$ can then be estimated based on the following relationship:

$$C_{BD} = (N_H)(N_V)(C_E)(FE_G - FE_D) - (N_{Total})(C_D) \qquad \text{Equation (6)}$$

Where parameters CE, CD and FEG are pre-determined constants and parameters $N_H$, $N_V$, $FE_D$ and $N_{Total}$ are values determined from the sampled heatmap.

Figure 5:
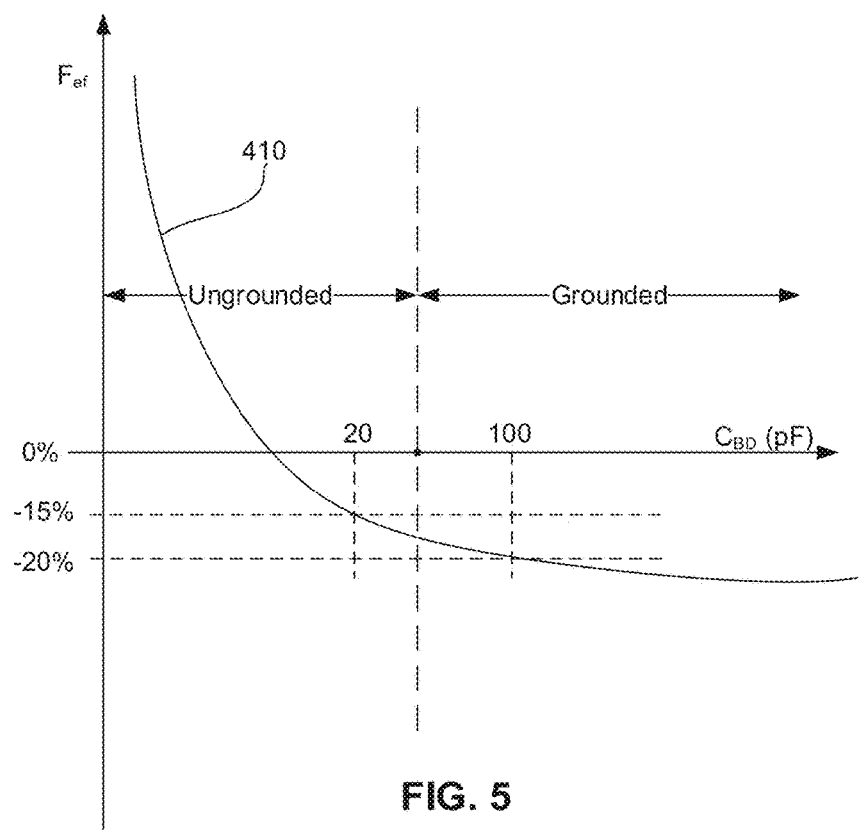
FIG. 5 is a simplified graph of relative effect as a function of capacitance between a user and a touch enabled computing device in accordance with some embodiments of the present disclosure.

Reference is now made to FIG. 5 showing a simplified graph of relative effect as a function of capacitance between a user and a touch enabled computing device in accordance with some embodiments of the present disclosure. The relative effect or finger effect (FE) detected on a touch screen is sensitive to capacitance $C_{BD}$-$C_{BD}$ may ranges between 20-150 pF for mobile device. When a computing device is fully grounded $C_{BD}$ is even higher, e.g. between 100-500 pF and higher. FE for these ranges are negative, e.g. finger touch has the effect reducing the mutual capacitance at the junction. Amplitude of FE can typically range about between −10% from baseline for low $C_{BD}$ to −20% from baseline for high $C_{BD}$. As the impedance to ground decreases, FE increases in the negative direction. According to some exemplary embodiments, curve 410 is defined as a model that relates FE to $C_{BD}$ for a defined number of fingers, e.g. one finger and a defined number of touched junctions, e.g. one junction. Similar curves may be defined for multi-touch and for different sized fingers.

Figure 6:
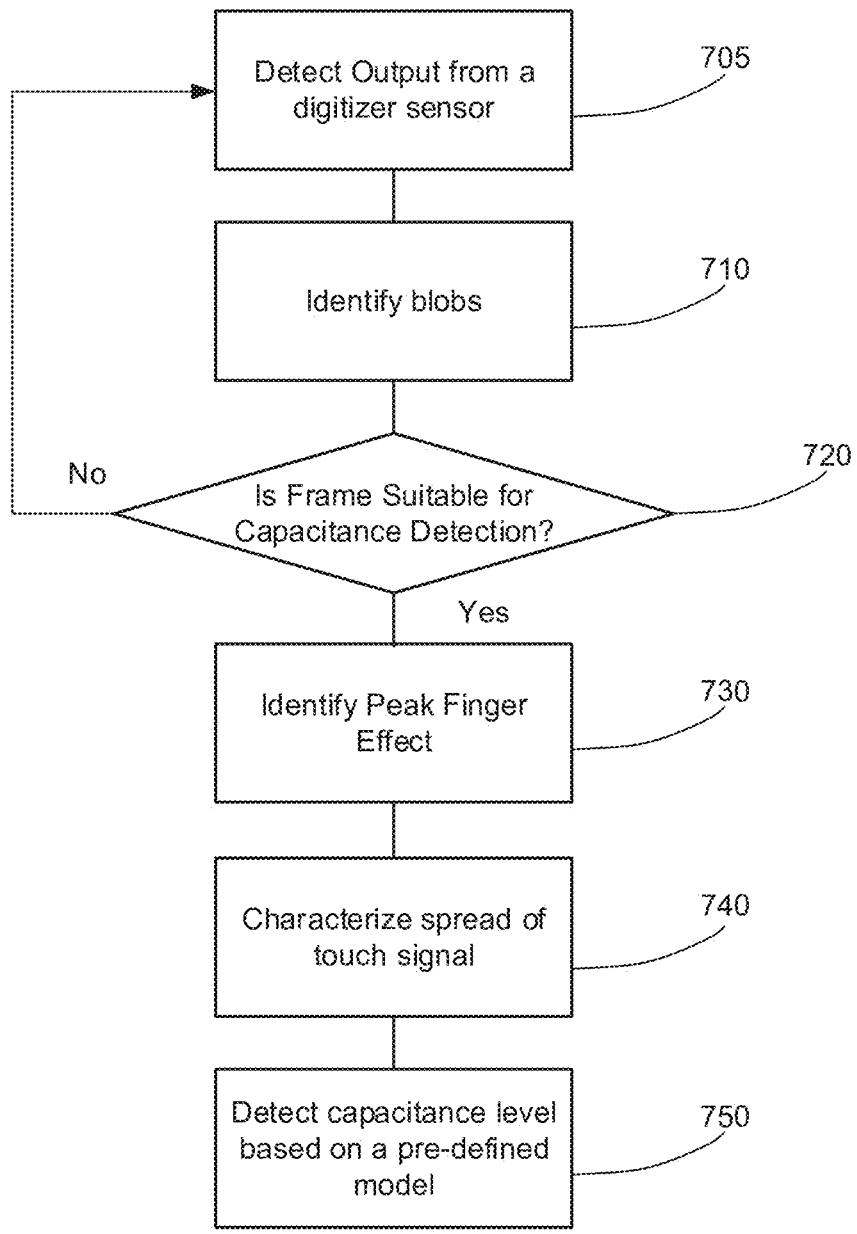
FIG. 6 is a simplified flow chart of an exemplary method detecting capacitance between a user and a touch enabled device in accordance with some exemplary embodiments of the present disclosure.

Reference is now made to FIG. 6 showing a simplified flow chart of an exemplary method detecting capacitance between a user and a touch enabled device in accordance with some exemplary embodiments of the present disclosure. Output from a grid based digitizer sensor is detected while a user is operating a touch enabled computing device (block 705). Optionally, $C_{BD}$ detection is applied once every few frames or optionally on every frame detected. The output detected is touch signals at junctions of a digitizer sensor. A heatmap of the touch signals at each junction may be constructed. A processor or circuit 25 may be programmed to detect blobs, e.g. areas at which touch signals are identified (block 710). In some exemplary embodiments, geometry or characteristics of the blobs are examined to determine if the output from the frame is suitable for detecting $C_{BD}$ based on the defined model (block 720). Typically, frames that include blobs with heavy deformations or blobs with low relative effect are not used for detecting $C_{BD}$.

If the frame is accepted, peak amplitudes of the blobs are detected and a representative blob is selected based on which the model for detecting $C_{BD}$ will be applied (block 730). Parameters $N_V$, $N_H$, and $N_{TOTAL}$ may be determined based on characterization of the spread of the detected touch signals (block 740). Typically, $N_V$, $N_H$, and $N_{TOTAL}$ are parameters that can be extracted from the heatmap. $C_{BD}$ may be estimated based on a pre-defined model relating $C_{BD}$ to FE $N_V$, $N_H$, and $N_{TOTAL}$ (block 750).

Typically, a grounding state of the computing device is determined based on average $C_{BD}$ detected over time. Typically, an adaptive history buffer is used to update the average $C_{BD}$. $C_{BD}$ may be detected every few frames, e.g. every 3-10 frames during user touch interaction. Optionally, a rate at which $C_{BD}$ is detected depends on a current status of the computing device.

Figure 7:
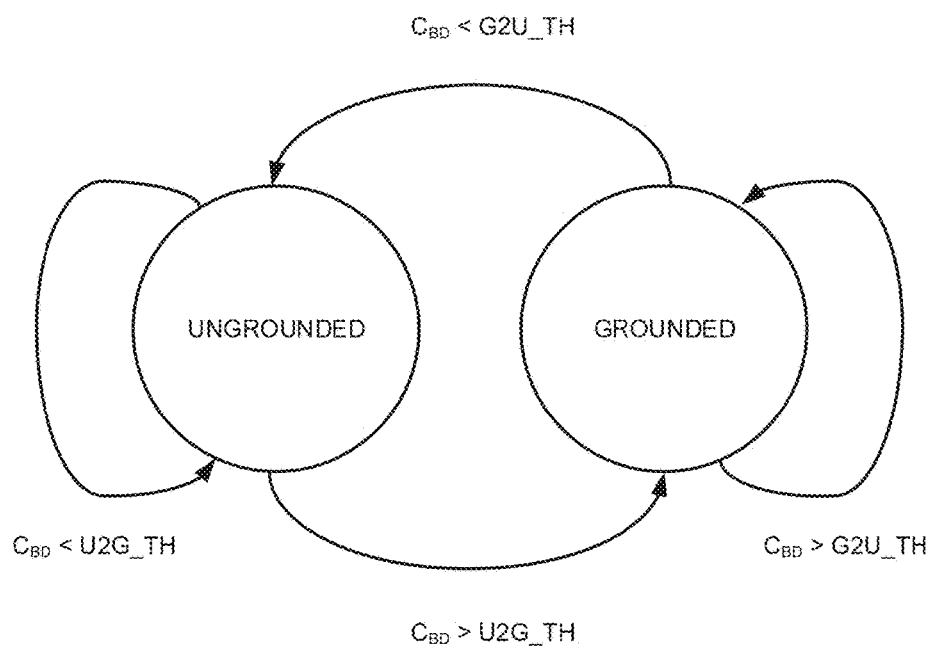
FIG. 7 is a simplified schematic representation of a grounding state machine in accordance with some embodiments of the present disclosure.

Reference is now made to FIG. 7 showing a simplified schematic representation of a grounding state machine in accordance with some embodiments of the present disclosure. Optionally, a computing device is assumed to be in an 'Ungrounded' state while no information is available. After a pre-defined number of $C_{BD}$ detections, the $C_{BD}$ is checked against a first threshold, an ungrounded to grounded threshold (U2G_TH). If $C_{BD}$ is greater than the first threshold, the state changes to 'Grounded.' U2G_TH may typically be set to a value above 50 pF, e.g. 70 pF. Average $C_{BD}$ are gathered and as long as $C_{BD}$ does not fall below a second threshold, a grounded to ungrounded threshold (G2U_TH) the state of the machine is maintained. G2U_TH may typically be set to a value below 50 pF, e.g. 30 pF. Once $C_{BD}$ fall below the second threshold the state of the machine is changed to 'Ungrounded'. Average $C_{BD}$ are gathered and as long as $C_{BD}$ is below (U2G_TH) the state of the machine is maintained. According to some embodiments, a state of the grounding state machine is first defined based on an average of 4-10 $C_{BD}$ detections and then updated using more detections, e.g. 20-50 $C_{BD}$ detections.

Figure 8A:
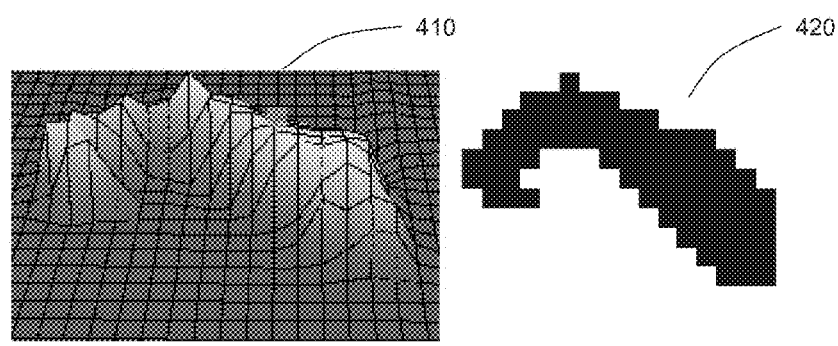
FIGS. 8A and 8B are heatmaps detected and corresponding two dimensional blobs of a palm touch signal while a computing device is well grounded and not well grounded respectively.
Figure 8B:
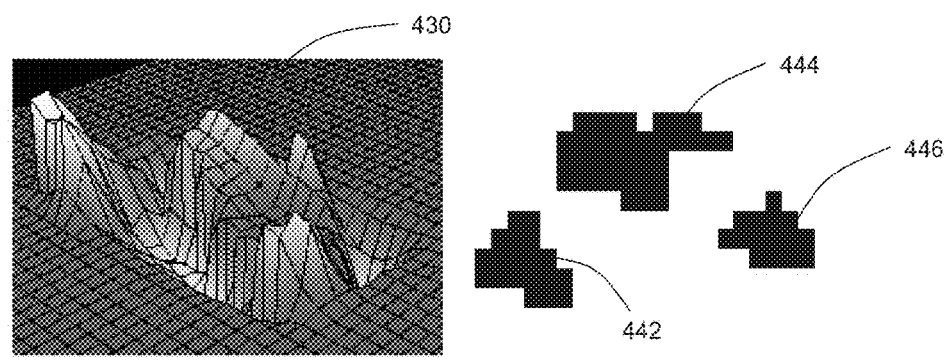

Reference is made to FIGS. 8A and 8B showing heatmaps detected and corresponding two dimensional blobs of a palm touch signal while a computing device is well grounded and not well grounded respectively. While a computing device is well grounded, heat map 410 shows a well defined peak in the touch area and the blob 420 appears as a single area.

Heatmaps 410 and 430 show absolute values for amplitude. However, when a computing device has a high impedance to ground, heatmap 430 is distorted due to coupling of potentials picked up by the palm. The coupling of potentials picked up by the palm reverses the effect of the touch signal. This distortion can lead to a single touch area being depicted as a plurality of separate blobs 442, 444, 446 based on heatmap 430 and blobs 442, 444, 446 may be mistakenly identified as three close finger touches. According to some exemplary embodiments, parameters defining sensitivity of image segmentation are adjusted based on a grounding state of the computing device.

For example, while the computing device is defined as 'Ungrounded' multiple touch signals are detected using relatively crude image segmentation schemes and while the computing device is defined as 'Grounded' finer image segmentation schemes are applied. Optionally, for 'Ungrounded' states processing schemes directed toward detecting close finger touches or separating blobs resulting from close finger touches are not applied.

According to some aspects of the present disclosure there is provided a device comprising: a display; a controller configured to control the display; sensor having electrode junctions and wherein the sensor is configured to sense touch input at a plurality of the junctions; and a circuit configured to: sample output from the sensor; detect capacitance between the device ground and a user touching the sensor ($C_{BD}$) based on the output sampled and a pre-defined model; define one of two grounding states of the device based on the capacitance detected; process the output based on the grounding state defined; determine touch coordinates based on the output processed; and report the touch coordinates to the controller.

Optionally, the model is a physical model for $C_{BD}$ capacitive estimation based on a number of touched junctions and a relative effect, and wherein the number of touched junction and the relative effect is detected from the output sampled.

Optionally, the $C_{BD}$ is detected per frame of output sampled.

Optionally, the circuit includes a grounding state machine configured to define the grounding state based on accumulated averages of $C_{BD}$.

Optionally, the grounding state machine defines a grounded state or an ungrounded state.

Optionally, the grounding state machine stores a first threshold on $C_{BD}$ defined to switch from a grounded state to an ungrounded state and a second threshold on $C_{BD}$ defined to switch from the ungrounded state to the grounded state, wherein the first threshold is other than the second threshold.

Optionally, the circuit is configured to perform processing for palm rejection and wherein parameters of a palm rejection processing scheme is adjusted based on the defined grounding state.

Optionally, the circuit is configured to perform processing for finger separation and wherein parameters of a finger separation processing scheme is adjusted based on the defined grounding state.

Optionally, the circuit is configured to perform processing for finger separation and wherein the processing for finger separation is disabled based on defining an ungrounded state.

Optionally, $C_{BD}$ is modeled as total capacitance between the user and the device ground minus touch capacitance between the user and the sensor.

According to some aspects of the present disclosure there is provided a method comprising: sampling output from sensor having electrode junctions integrated on a device including a display; detecting capacitance between the device ground and a user ($C_{BD}$) based on the output sampled and a pre-defined model; defining one of two grounding states of the device based on the capacitance detected; processing the output based on the grounding state defined; determining touch coordinates based on the output processed; and reporting the touch coordinates to a controller of the display.

Optionally, the model is a physical model for $C_{BD}$ capacitive estimation based on a number of touched junctions and a relative effect, and wherein the number of touched junction and the relative effect is detected from the output sampled.

Optionally, the $C_{BD}$ is detected per frame of output sampled.

Optionally, the one of two grounding states is defined based on accumulated averages of $C_{BD}$.

Optionally, the two grounding states is grounded and ungrounded.

Optionally, the method includes switching from the grounded state to the ungrounded state based on a first threshold and switching from the ungrounded state to the grounded state based on a second threshold, wherein the first threshold is other than the second threshold.

Optionally, the method includes performing processing for palm rejection and wherein parameters of a palm rejection processing scheme is adjusted based on the defined grounding state.

Optionally, the method includes performing processing for finger separation and wherein parameters of a finger separation processing scheme is adjusted based on the defined grounding state.

Optionally, the method includes performing processing for finger separation and wherein the processing for finger separation is disabled based on defining an ungrounded state.

Optionally, $C_{BD}$ is modeled as total capacitance between the user and the device ground minus touch capacitance between the user and the sensor.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:
1. A method comprising:
sampling output from a sensor having electrode junctions integrated on a device including a display;
detecting capacitance between ground of the device and a user ($C_{BD}$) based on the output sampled at a first plurality of touch junctions along row conductive lines of the selected touched area and a second plurality of touch junctions along column conductive lines of the selected touched area;
defining one of two grounding states of the device based on the $C_{BD}$;
processing the output based on the grounding state defined;
determining touch coordinates based on the output processed; and reporting the touch coordinates to a controller of the display.

2. The method of claim 1, wherein the $C_{BD}$ is detected per frame of output sampled.

3. The method of claim 1, wherein the one of two grounding states is defined based on accumulated averages of $C_{BD}$.

4. The method of claim 3, wherein the two grounding states is grounded and ungrounded.

5. The method of claim 4, further comprising switching from the grounded state to the ungrounded state based on a first threshold and switching from the ungrounded state to the grounded state based on a second threshold, wherein the first threshold is other than the second threshold.

6. The method of claim 3, further comprising performing processing for palm rejection and wherein parameters of a palm rejection processing scheme is adjusted based on the defined grounding state.

7. The method of claim 3, further comprising performing processing for finger separation and wherein parameters of a finger separation processing scheme is adjusted based on the defined grounding state.

8. The method of claim 3, further comprising performing processing for finger separation and wherein the processing for finger separation is disabled based on defining an ungrounded state.

9. The method of claim 1, wherein $C_{BD}$ is modeled as total capacitance between the user and the device ground minus touch capacitance between the user and the sensor.

10. A device comprising:
a display;
a controller configured to control the display;
a sensor having electrode junctions, the sensor configured to sense touch input; and
a circuit in communication with the sensor, the circuit configured to:
sample output from the sensor;
detect capacitance between ground of the device and a user ($C_{BD}$) based on the output sampled at a a first plurality of touch junctions along row conductive lines of the selected touched area, a second plurality of touch junctions along column conductive lines of the selected touched area, and a geometric spread of the touched junctions of the selected touched area;
define one of two grounding states of the device based on the $C_{BD}$;
process the output based on the grounding state defined;
determine touch coordinates based on the output processed; and
report the touch coordinates to the controller.

11. The device of claim 10, wherein the $C_{BD}$ is detected per frame of output sampled.

12. The device of claim 10, wherein the circuit includes a grounding state machine configured to define the grounding state based on accumulated averages of $C_{BD}$.

13. The device of claim 12, wherein the grounding state machine defines a grounded state or an ungrounded state.

14. The device of claim 13, wherein the grounding state machine stores a first threshold on $C_{BD}$ defined to switch from a grounded state to an ungrounded state and a second threshold on $C_{BD}$ defined to switch from the ungrounded state to the grounded state, wherein the first threshold is other than the second threshold.

15. The device of claim 12, wherein the circuit is configured to perform processing for palm rejection and wherein parameters of a palm rejection processing scheme is adjusted based on the defined grounding state.

16. The device of claim 12, wherein the circuit is configured to perform processing for finger separation and wherein parameters of a finger separation processing scheme is adjusted based on the defined grounding state.

17. The device of claim 12, wherein the circuit is configured to perform processing for finger separation and wherein the processing for finger separation is disabled based on defining an ungrounded state.

18. The device of claim 10, wherein the $C_{BD}$ is modeled as total capacitance between the user and the device ground minus touch capacitance between the user and the sensor.

19. The method of claim 1, wherein in the sensor includes a grid formed with row conductive lines and column conductive lines and wherein the geometric spread of the touched junctions is defined based on a first number of the first plurality of touch junctions in a row conductive line and a second number of the second touch junctions in a column conductive line.

20. One or more computer-storage memory devices embodied with machine-executable instructions for defining grounding states of a device, comprising:
sampling output from a sensor having electrode junctions integrated on a device including a display;
detecting capacitance between ground of the device and a user ($C_{BD}$) based on the output sampled at a first plurality of touch junctions along row conductive lines of the selected touched area and a second plurality of touch junctions along column conductive lines of the selected touched area;
defining one of two grounding states of the device based on the $C_{BD}$;
processing the output based on the grounding state defined;
determining touch coordinates based on the output processed; and
reporting the touch coordinates to a controller of the display.

* * * * *